3 Sheets—Sheet 1.

G. CROMPTON.
CAR-TRUCK.

No. 193,439. Patented July 24, 1877.

Witnesses.
L. H. Latimer
H. J. Pratt

Inventor.
George Crompton
per Crosby Gregory

N. PETERS, PHOTO-LITHOGRAPHER, WASHINGTON, D. C.

3 Sheets—Sheet 2.

G. CROMPTON.
CAR-TRUCK.

No. 193,439. Patented July 24, 1877.

Witnesses.
L. H. Latimer.
H. J. Pratt.

Inventor.
George Crompton
per Crosby & Gregory Att'ys

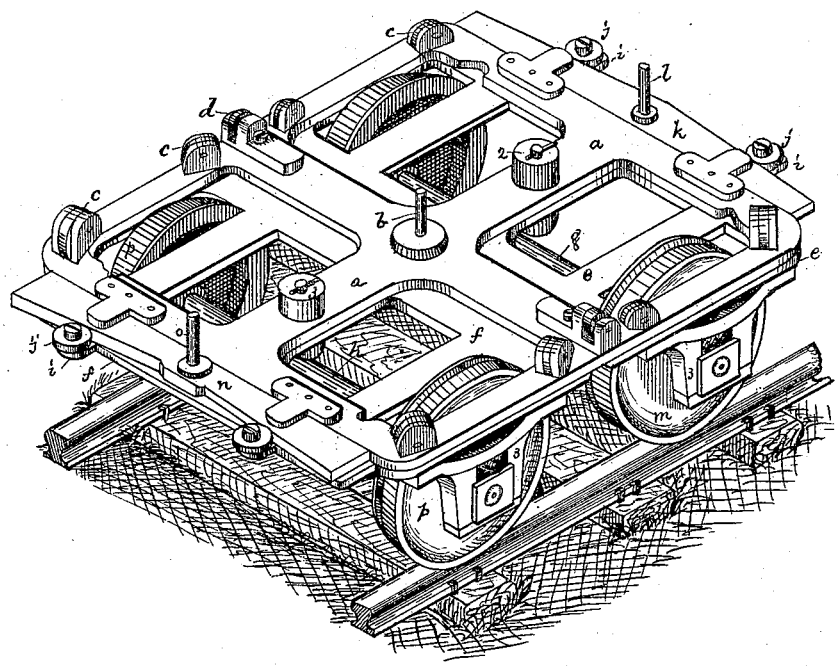

UNITED STATES PATENT OFFICE.

GEORGE CROMPTON, OF WORCESTER, MASSACHUSETTS.

IMPROVEMENT IN CAR-TRUCKS.

Specification forming part of Letters Patent No. 193,439, dated July 24, 1877; application filed March 7, 1877.

*To all whom it may concern:*

Be it known that I, GEORGE CROMPTON, of Worcester, in the county of Worcester and State of Massachusetts, have invented an Improvement in Car-Trucks, of which the following is a specification:

This invention relates to improvements in car-trucks for railway-cars, and has for its object the positive and automatic adaptation of the wheels of the truck to curves in the track, in order that the axles connecting opposite wheels may extend across the track in a radial line drawn from the center, from which the curve of the track is described.

This change of position of the wheels of the truck with reference to the curvature of the track lessens the liability of the truck jumping the track, reduces the wear between the flanges of the wheel and the inside of the track, and throws the strain on the flange and track in a vertical line below the axle, where the pressure of the periphery of the wheel is greatest upon the track.

The invention consists in a truck-frame and an axle-carrying frame pivoted thereto, and its axle and wheels, in combination with a wedge adapted to be operated by the change in position of the car-body and truck-frame on the wheels reaching a curve in the track, to place the axle-carrying frame and its axle and wheels with relation to the truck and the curve in the track, substantially as described.

Also, in a truck-frame and two connected axle-carrying frames, pivoted thereto on opposite sides of the king-bolt, adapted to hold the car-body and truck together, in combination with the sliding wedges operated by the change in the relative position of the car-body and truck, on reaching a curve, to move both axle-carrying frames, axles, and wheels automatically and simultaneously, substantially as described.

Figure 1:
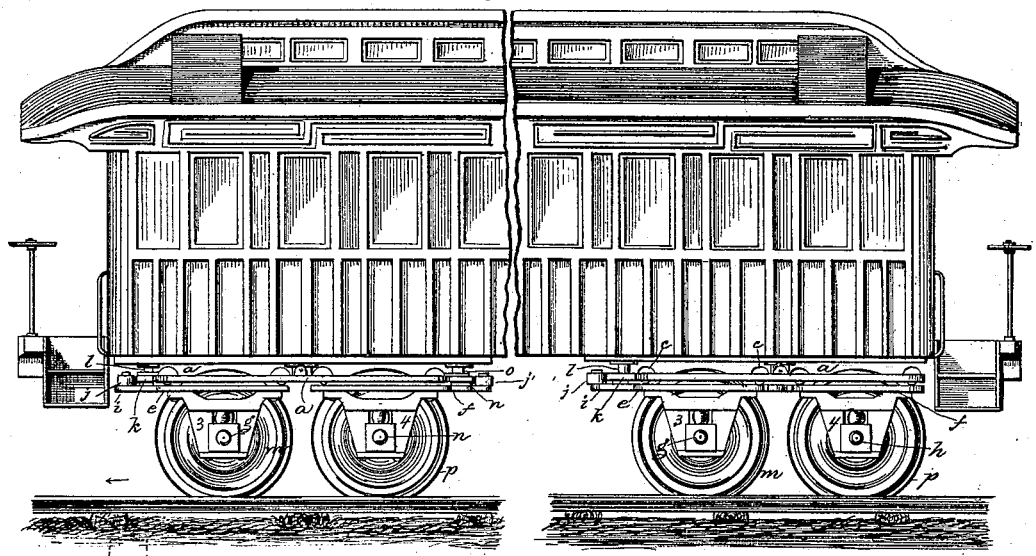
Figure 2:
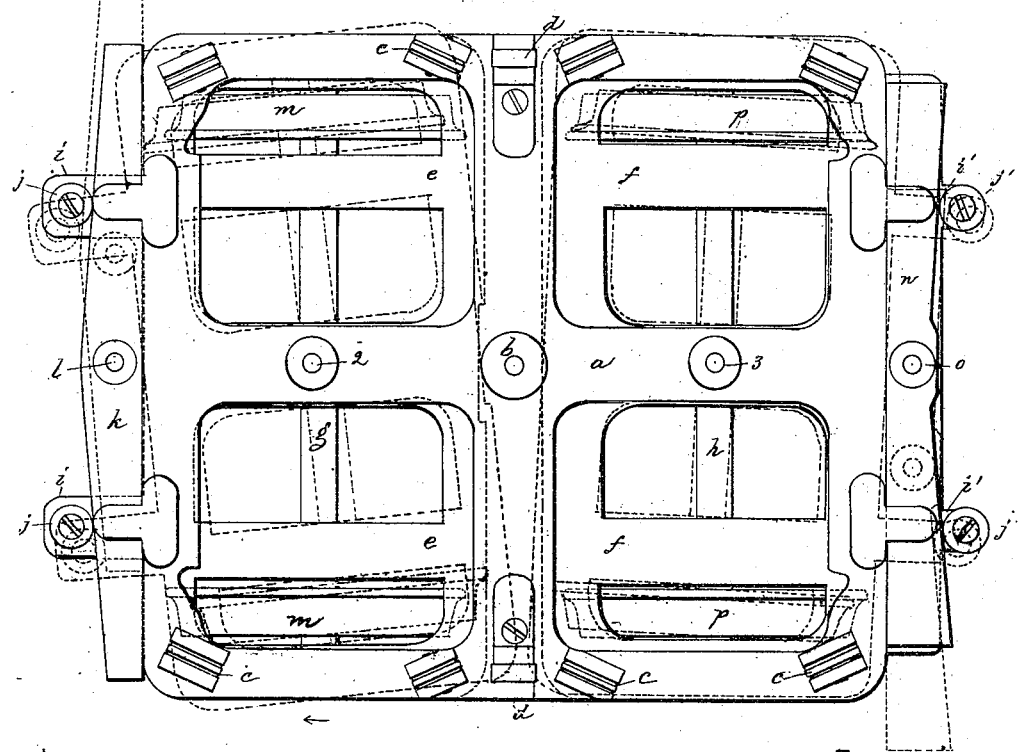
Figure 3:
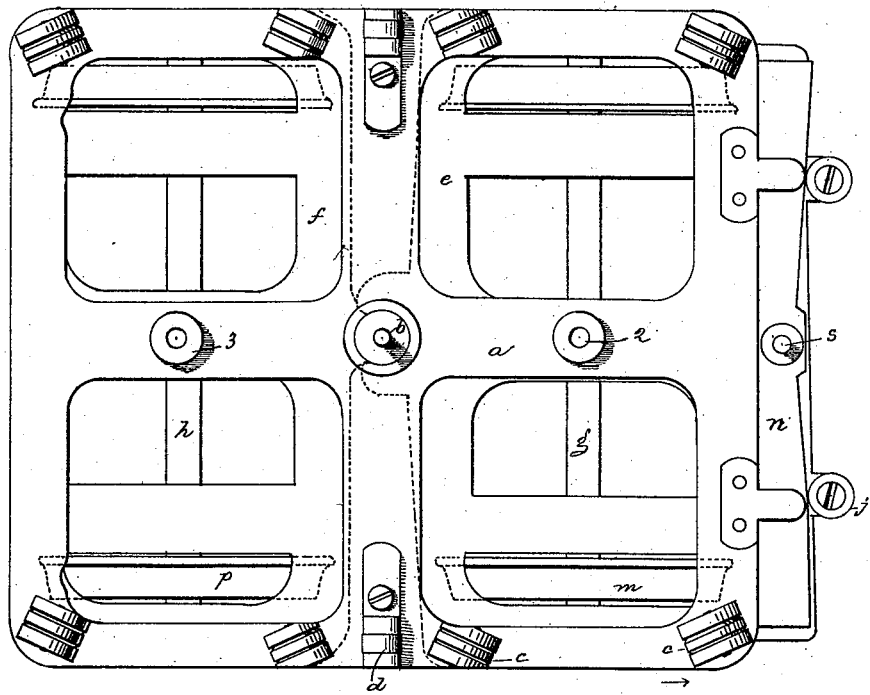
Figure 4:
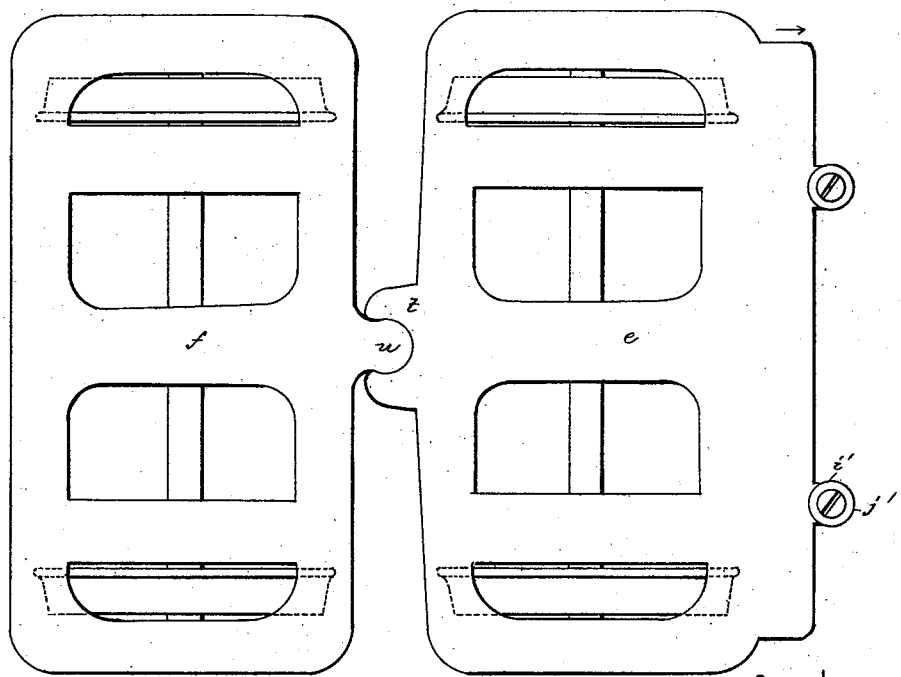

Figure 1 represents, in side elevation, a car provided with my improved truck; Fig. 2, a top view of a truck delineating my invention; Fig. 3, a top view of a truck with but one wedge; Fig. 4, a view of Fig. 3 with the truck-top removed; and Fig. 5, is a perspective view of Fig. 2.

The car-body may be of any usual construction. The truck-frame $a$ has a king-bolt, $b$, to enter a socket or plate upon the car bottom or a cross-beam thereon. This frame may, and, preferably, will, be provided with anti-friction rollers or wheels $c$ $d$, in any desired number. Axle-carrying frames $e$ $f$ are connected by auxiliary king-bolts 2 3 with the frame $a$.

Frames $e$ $f$ have hangers 3 4, provided with any usual journal-boxes adapted to receive the ends of axles $g$ $h$, each provided at each end with a wheel, as on common trucks. Studs or rollers, $j$, on arms $i$, projecting from frame $e$, (see Fig. 1,) are acted upon by the inclined face of a sliding wedge, $k$, provided with a pin, $l$, adapted to be connected with the car-body.

Suppose the truck and car moving in the direction of the arrows, Figs. 1 and 2: Now, when the wheels $m$ reach a curved portion of the track they will follow it, causing the truck to turn upon the main king-bolt $b$, connecting the truck and car-body, and such movement of the truck with reference to the car-body will cause the body, through its connection with the wedge $k$ at $l$, to slide the wedge, which, acting upon the pins or rollers $j$, will turn the frame $e$ upon its king-bolt 2, and throw the axle $g$ in a line radial with relation to the curve of the track. A wedge, $n$, acts upon studs or rollers, $j'$, on arms $i'$, of pivoted frame $f$, and as the car-body and truck change their relative positions on reaching a curve in the track, the wedge is moved, through its connection $o$, with the car-body, and the frame $f$ and axle $h$ and wheels $p$ are changed in position on the subordinate king-bolt 3 to place the axle $h$ in a line radial with the center from which the curve of the track is described.

In Fig. 1 each frame $e f$ is provided with a wedge to move it, and the wedges inclined in opposite direction will cause the wheels at the outer curve to recede from and those at the inner curve to approach each other.

Instead of employing a wedge for each frame, a wedge, as at $n$, Fig. 3, moved by the car-body, as it and the truck change position, may shift the frame $e$, and its axle and wheels $m$ and frame $e$, through a socket or fork, $t$, embracing a projection or pintle, $u$, on frame $f$, (or their equivalents,) will turn the frame $f$ upon its king-bolt 3, in the same manner as though it was moved by the wedge. The wedges are easily moved. Made as long bars, they are very strong and durable, and, acting upon the frames and between their rollers and the truck-plate *a*, they move the axles positively.

The wedge-shaped bars hold the axle-carrying frames positively in position, both when wheels are on a curved and straight track, and prevent any change of position of such axles, except as produced by the car-body as it changes its position with relation to a curved or straight track.

I claim—

1. A truck-frame and two connected axle-carrying frames, pivoted to the truck-frame, as described, on opposite sides of the king-bolt, adapted to hold the car-body and truck-frame together, in combination with a transversely-sliding wedge operated by the change in the relative positions of the car-body and truck-frame, and located between the axle-carrying frame and truck-frame, to move the axle-carrying frame or frames, axles, and wheels automatically, substantially as described.

2. The wedge-formed sliding bars and car-body, in combination with the truck-frame and independent axle-carrying frames pivoted thereto, as described, whereby the axles are controlled in position independently, each by its own wedge moved by the car-body, and are placed in radial or parallel lines, to adapt the wheels and axles to a curved or straight track, substantially as described.

3. The double-inclined transversely-sliding wedge, arranged between the truck-frame, which is connected with the car-body by a king-bolt, and the pivoted axle-carrying frame, in combination with the car-body, to change the position of the wedge and positively hold the axle-carrying frame at right angles to the track, or radially therewith, substantially as described.

4. The truck-frame and transversely-sliding double-inclined wedge, in combination with the axle-carrying frame and friction-rollers *j*, substantially as described.

In testimony whereof I have signed my name to this specification in the presence of two subscribing witnesses.

GEO. CROMPTON.

Witnesses:
J. B. SYME,
J. A. WARE.